United States Patent
Camhi (10) Patent No.: US 12,291,222 B2
(45) Date of Patent: May 6, 2025

(54) CONTROL SYSTEM USING A COMBINED PEDAL AND FEEDBACK FOR RECOMMENDING SPEED

(71) Applicant: Toyota Research Institute, Inc., Los Altos, CA (US)

(72) Inventor: Jaime S. Camhi, Los Gatos, CA (US)

(73) Assignee: Toyota Research Institute, Inc., Los Altos, CA (US)

(*) Notice: Subject to any disclaimer, the term of this patent is extended or adjusted under 35 U.S.C. 154(b) by 404 days.

(21) Appl. No.: 17/708,562

(22) Filed: Mar. 30, 2022

(65) Prior Publication Data
US 2023/0311911 A1 Oct. 5, 2023

(51) Int. Cl.
| | | |
|---|---|---|
| B60W 50/08 | (2020.01) |
| B60K 26/02 | (2006.01) |
| B60T 7/04 | (2006.01) |
| B60W 60/00 | (2020.01) |

(52) U.S. Cl.
CPC ......... B60W 50/082 (2013.01); B60K 26/021 (2013.01); B60T 7/042 (2013.01); B60W 60/001 (2020.02); B60K 2026/023 (2013.01); B60T 2220/04 (2013.01); B60W 2540/10 (2013.01); B60W 2540/12 (2013.01)

(58) Field of Classification Search
CPC ............ B60W 50/082; B60W 60/001; B60W 2540/10; B60W 2540/12; B60K 26/021; B60K 2026/023; B60T 7/042; B60T 2220/04
See application file for complete search history.

(56) References Cited

U.S. PATENT DOCUMENTS

| | | | |
|---|---|---|---|
| 1,535,867 A | 4/1925 | Sears |
| 3,063,526 A | 11/1962 | Griffen |
| 4,273,211 A | 6/1981 | Sarmiento |
| 6,023,995 A | 2/2000 | Riggle |

(Continued)

FOREIGN PATENT DOCUMENTS

| | | |
|---|---|---|
| CN | 104554199 A | 4/2015 |
| CN | 214984854 U | 12/2021 |
| GB | 1063067 A | 3/1967 |

OTHER PUBLICATIONS

MathBits Notebook, "Transformations: Rotations" (Year: 2019).*

(Continued)

*Primary Examiner* — Aniss Chad
*Assistant Examiner* — Stephanie T Su
(74) *Attorney, Agent, or Firm* — Christopher G. Darrow; Darrow Mustafa PC (57) ABSTRACT

System, methods, and other embodiments described herein relate to communicating a recommended speed through feedback on a combined pedal for acceleration or braking. In one embodiment, a control system includes a pedal coupled to a first device having a throttle sensor for a vehicle and a first actuator that generates throttle feedback by applying force to the pedal. The control system also includes the pedal being coupled to a second device having a brake activation sensor for the vehicle and a second actuator that generates braking feedback, the first actuator triggers a rotation of the pedal that initiates a braking command through the brake activation sensor according to a recommended speed computed using vehicle data.

20 Claims, 5 Drawing Sheets

(56) References Cited

U.S. PATENT DOCUMENTS

| | | | |
|---|---|---|---|
| 6,357,232 B1* | 3/2002 | Strashny | G05G 1/30 60/431 |
| 2005/0057087 A1* | 3/2005 | Ahnafield | G05G 1/46 303/20 |
| 2007/0138863 A1* | 6/2007 | Clark | G05G 5/18 303/125 |
| 2015/0239442 A1* | 8/2015 | Yamakado | B60T 8/17555 701/70 |
| 2020/0378491 A1* | 12/2020 | David | F16H 59/18 |
| 2021/0387523 A1* | 12/2021 | Shinohara | G05G 5/03 |

OTHER PUBLICATIONS

How A Car Works, "How the braking system works" (Year: 2013).*

Google search for "brake pedal rotates when pushed how do brake pedals work," providing publishing date for "How the braking system works" (Year: 2013).*

Duncan Graham-Rowe, "Combined accelerator and brake pedal could save lives," Jan. 10, 2002, 4 pages, found at https://www.newscientist.com/article/dn1770-combined-accelerator-and-brake-pedal-could save-lives/.

Unknown, "Single Pedal For Activating Brake and Acceleration," 6 pages, last accessed on Feb. 21, 2022, found at https://frigateprojects.com/shop/projects/latest-projects/single-pedal-for-activating-brake-and-acceleration/.

Unknown, "Lexus How-To: Lane Tracing Assist," Jan. 28, 2021, 1 page, found at https://www.youtube.com/watch?v=mlPD_cyMWak.

* cited by examiner

CONTROL SYSTEM USING A COMBINED PEDAL AND FEEDBACK FOR RECOMMENDING SPEED

TECHNICAL FIELD

The subject matter described herein relates, in general, to a control system providing a recommended speed for a vehicle, and, more particularly, to the control system communicating a recommended speed using actuator feedback on a combined pedal.

BACKGROUND

A vehicle receives operator commands through different vehicle systems for maneuvering. For example, a steering wheel is an interface that receives operator commands for lateral control. Pedals are used for acceleration and braking for longitudinal control. In one approach, a vehicle influences operator commands through feedback. For example, a control system applies pressure (e.g., vibration) on a pedal or seat as feedback to maintain a maneuver. However, the control system provides feedback on a pedal unidirectionally or in a few directions (e.g., upward, pushing) that limits guidance capabilities.

In various implementations, the control system gives longitudinal feedback when an operator foot is on a certain pedal (e.g., an accelerator or brake pedal). As such, the control system delays feedback until an operator places a foot on the accelerator or the brake. This delay impacts safety and comfort. Moreover, using other feedback modalities by the control system can be unintuitive. Furthermore, operation by the control system can also reduce safety when feedback is coupled to sensing operator commands. For instance, a control system generating feedback as pressure on a pedal can cause an unusual speed command by the operator, such as through overreaction by hard braking, whereas the vehicle maintaining a maneuver with passive guidance is safer.

SUMMARY

In one embodiment, example systems relate to a manner of improving systems communicating a recommended speed from an automated driving system (ADS) through feedback on a combined pedal for acceleration or braking. In various implementations, systems that provide longitudinal feedback for vehicle maneuvers have few guidance capabilities. For example, a system generating longitudinal feedback on a pedal does so unidirectionally by pushing instead of pulling the pedal. Furthermore, the control system may use feedback on the pedal that is coupled to operator commands for maneuvering the vehicle. This can create unsafe scenarios when the feedback is misunderstood by an operator, such as through unintended acceleration. Therefore, in one embodiment, a control system uses a combined pedal having sensors that detect operator commands and actuators (e.g., solenoids) communicating recommended speeds from an ADS to an operator, such as during manual driving, with additional degrees of freedom. In particular, the combined pedal can virtually "pull" an operator towards a pedal position by pushing an opposite end using an extended actuator through energization. The pressure on the foot through the pedal causes a rotation about a pivot towards an acceleration or braking sensor. In one approach, the actuator applies force on a foot platform that is separate from the pedal. In this way, the control system provides feedback for the recommended speed with minimal effects on a pedal position, thereby reducing interruptions.

In various implementations, the control system has the combined pedal centrally pivoted using a rotational assembly on a vehicle floor for communicating the recommended speeds through feedback to multiple feet, such as during increased control by the ADS. Here, the floor may be portions of the footwell used as resting positions for the operator. As such, an operator uses a left and right foot for initiating commands while positioned effectively orthogonal to the combined pedal. In this way, the control system ensures that the operator receives the feedback for the recommended speed absent vehicle control. This also increases awareness by the operator about upcoming maneuvers by the ADS to improve comfort even when shared control is minimal. Furthermore, the control system can include a foot platform separate from the pedal that receives feedback through force from an actuator. In this way, the control system provides feedback for the recommended speed while maintaining a pedal position, thereby avoiding possible unsafe reactions by the operator. Thus, the control system improves speed change recommendations by allowing feedback through multiple directions and decoupling feedback from pedal operation for safer communication.

In one embodiment, a control system for communicating a recommended speed through feedback on a combined pedal for acceleration or braking is disclosed. The control system includes a pedal coupled to a first device having a throttle sensor for a vehicle and a first actuator that generates throttle feedback by applying force to the pedal. The control system also includes the pedal being coupled to a second device having a brake activation sensor for the vehicle and a second actuator that generates braking feedback, the first actuator triggers a rotation of the pedal that initiates a braking command through the brake activation sensor according to a recommended speed using vehicle data.

In one embodiment, a control system for communicating a recommended speed through feedback on a combined pedal for acceleration or braking is disclosed. The control system includes a pedal coupled to a first device having a throttle sensor for a vehicle and a first actuator that generates throttle feedback by applying force, the pedal centrally pivoted on a floor for separate control through a first end and a second end and orthogonal to an operator. The control system also includes the pedal being coupled to a second device having a brake activation sensor for the vehicle and a second actuator that generates acceleration feedback, the first actuator triggers a braking command through the brake activation sensor according to a recommended speed from an ADS.

In one embodiment, a control system for communicating a recommended speed through feedback on a combined pedal for acceleration or braking is disclosed. The control system includes a pedal coupled to a throttle sensor for a vehicle and a first actuator that generates throttle feedback by applying force to a platform. The control system also includes the pedal being coupled to a brake activation sensor for the vehicle and a second actuator that generates braking feedback to the platform, the first actuator initiates a braking command through the brake activation sensor according to a recommended speed from an ADS.

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving systems communicating a recommended speed from an automated driving system (ADS) through feedback on a combined pedal for acceleration or braking are disclosed herein. In various implementations, systems generate feedback on a pedal unidirectionally by pushing instead of pulling the pedal. Furthermore, a system communicating feedback for longitudinal control on multiple pedals can cause confusion, such as through unintended acceleration by an operator, thereby creating unsafe scenarios. Therefore, in one embodiment, a control system communicates a recommended speed to an operator using a combined pedal for acceleration and braking where actuators cause pushing and pulling sensations to a foot by extending members. Prior to recommending the speed change to the operator, a control system may determine that a safety margin or other metric satisfies a threshold and extends actuators accordingly. In one approach, a throttle actuator for a throttle sensor applies force to the pedal as feedback according to a recommended speed decrease by the ADS (e.g., an autonomous system, an advanced driver assistance system (ADAS), etc.). This effectively "pulls" the foot by drawing (e.g., through rotation) the foot towards the end having a brake activation sensor. As such, the vehicle may decrease speed through reduced acceleration commands or by initiating braking commands. Similarly, the control system causes a pulling sensation virtually by drawing the foot toward the end having the throttle sensor by applying actuator force to the end having the brake activation sensor. This action may occur when the ADS recommends a speed increase.

In various implementations, the control system separates feedback for ADS recommended speeds to an operator from controlling the combined pedal. In particular, a foot platform is centrally pivoted on the pedal with actuators that communicate recommended speeds through force or pressure while the pedal remains in a position. As such, the feedback is separate or independent of the control inputs to the pedal, thereby reducing interruptions for certain driving scenarios. For instance, a throttle actuator pushes the foot platform as throttle feedback according to a recommended speed decrease by the ADS with limited impact to the pedal position or engagement. In one approach, the control system causes a brake actuator of the brake activation sensor to selectively resist the motion of the pedal, thereby maintaining the position.

In addition, the control system may utilize a combined pedal centrally positioned on the floor of the vehicle where different feet control operator commands according to recommended speeds by the ADS. Here, the floor may be portions of the footwell used as resting positions for the operator and the pedal is orthogonal to the operator. Furthermore, the control system may communicate brake feedback using a throttle actuator for a throttle sensor when the ADS recommends a speed decrease. The throttle actuator applies force to a foot through the pedal for decreasing speed by reducing acceleration commands and moving the foot to initiate brake commands on another distal end. The force or pressure can also cause another foot to initiate brake commands through a brake activation sensor for multi-feet control.

In various implementations, the control system may also separate feedback for ADS recommended speeds from controlling a combined pedal positioned on a floor, thereby reducing interruptions for certain driving scenarios. Here, a foot platform is centrally pivoted on the pedal with ends movable by actuators according to the recommended speeds while the pedal remains in a position. One end of the pedal has a brake activation sensor while another end has a throttle sensor. In one approach, a throttle actuator pushes the foot platform on the right portion as braking feedback according to a recommended speed decrease with limited impact to the pedal position. Furthermore, the control system may cause a brake actuator of the brake activation sensor to selectively resist the motion of the pedal, thereby maintaining the position before receiving foot pressure for the braking command. Accordingly, the control system uses a combined pedal that communicates recommended speed changes by the ADS intuitively and safely for control through one or more feet.

Figure 1:
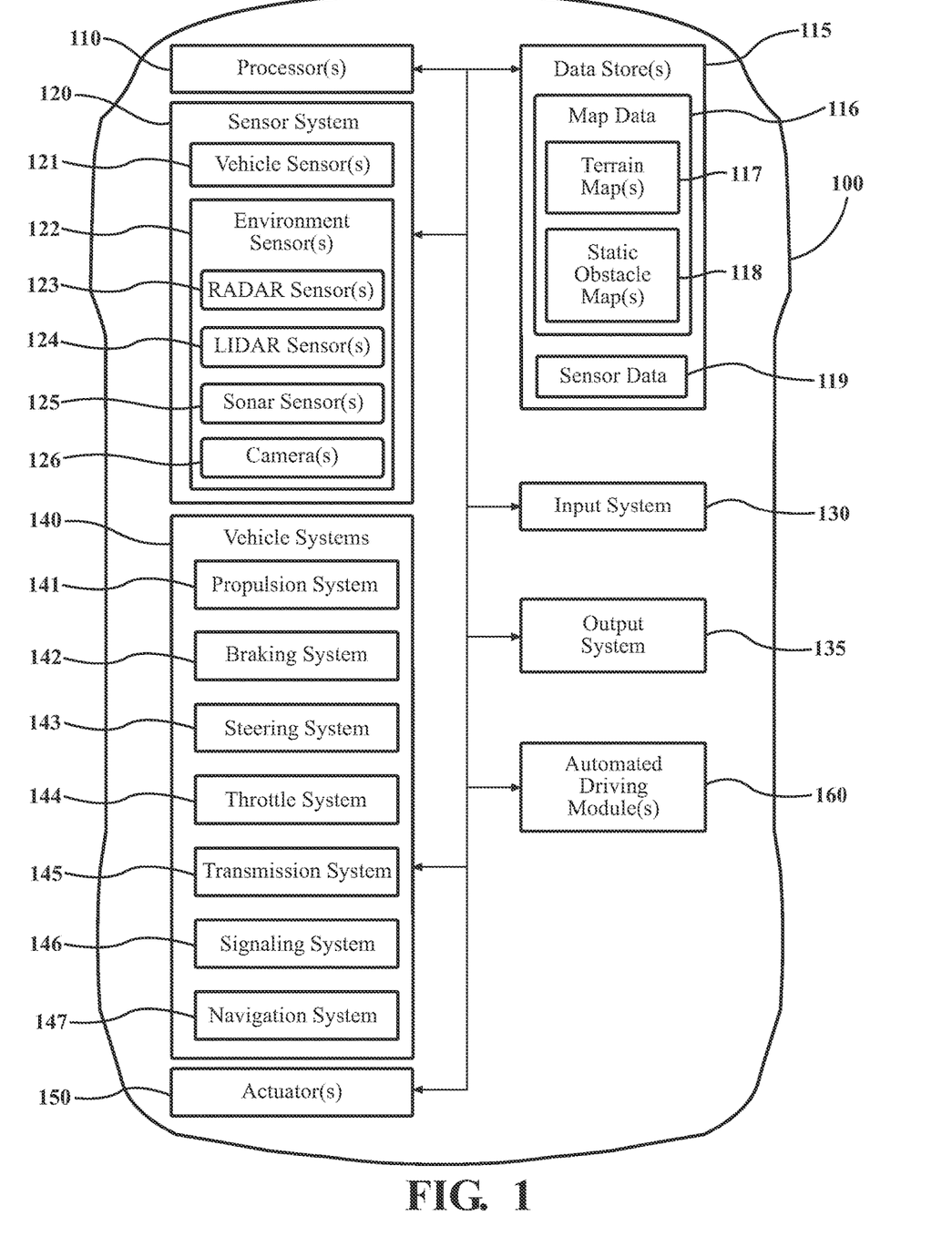
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles (e.g., robots, aircraft, etc.).

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes components that perform functions relating to improving systems communicating a recommended speed from an ADS through feedback on a combined pedal for acceleration or braking.

Figure 2A:
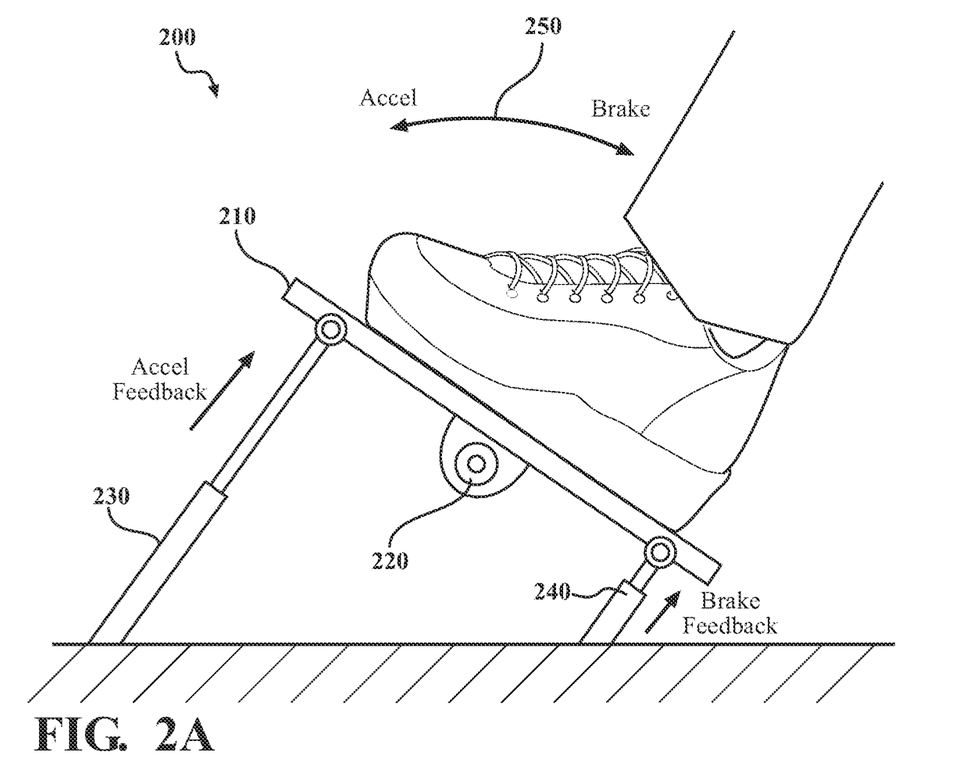
FIG. 2A illustrates one embodiment of a control system including a combined pedal having sensors that receive operator commands and actuators that communicate recommended speeds.

Now turning to FIG. 2A, one embodiment of a control system 200 including a combined pedal having sensors that receive operator commands and actuators that communicate recommended speeds is illustrated. Here, a pedal 210 may be a combined pedal such that operator commands for the vehicle 100 are receivable through a single foot. As such, the control system 200 includes the accelerator device 230 having a throttle sensor and an actuator that extends to push the pedal 210 for feedback, such as throttle feedback. In various implementations, the accelerator device 230 is pivoted to the pedal 210 and/or the floor according to kinematic specifications for the pedal 210. In one approach, the throttle sensor senses an input that the vehicle 100 translates into an operator command, such as using a pedal mapping. The vehicle 100 may also apply the input directly as the operator command. The actuator may be a linear actuator, solenoid, motor, pneumatic device, piston, hydraulic device, spring, and so on that applies pressure or force to the pedal 210, such as through extension, according to electronic controls from the control system 200. Furthermore, the control system 200 may be configured in an opposite manner where a front portion initiates braking commands and a back portion initiates acceleration commands.

Similarly, the braking device 240 may have a brake activation sensor and actuator that extends to push the pedal 210 for brake feedback. The braking device 240 may be pivoted to the pedal 210 and/or the floor according to kinematic specifications for the pedal 210. In one approach, the brake activation sensor detects an input that the vehicle 100 translates into an operator command, such as using a pedal mapping. The vehicle 100 may also apply the input directly as the operator command. Here, the actuator of the brake activation sensor may be a linear actuator, solenoid, motor, pneumatic device, piston, hydraulic device, spring, and so on that applies pressure or force by extending a member according to electronic controls from the control system 200.

In various implementations, the control system 200 communicates a recommended speed from the ADS to an operator through the feedback whether the automated driving module 160 is engaged or disengaged without intervention, such as during manual driving mode. For example, the vehicle 100 is in manual mode, shared control with the operator (e.g., lane-keeping assist), traded control (e.g., cruise control), or partial automation and decouples operator commands from vehicle control through communicating recommendations instead of intervening. Here, the ADS may be an autonomous system or an ADAS that recommends speed. Furthermore, a recommended speed can be computed by a vehicle system using the map data 116 or the sensor data 119 instead of an ADS.

In one approach, prior to recommending the speed change, the control system 200 may determine that a safety margin or other metric satisfies a threshold and extends actuators accordingly. Moreover, by using the pedal 210 as the source for both throttle and braking commands, the control system 200 ensures that the operator receives the recommended speed. Accordingly, the control system 200 communicates the recommended speed more reliably while allowing an operator to maintain control of the vehicle 100.

Figure 2B:
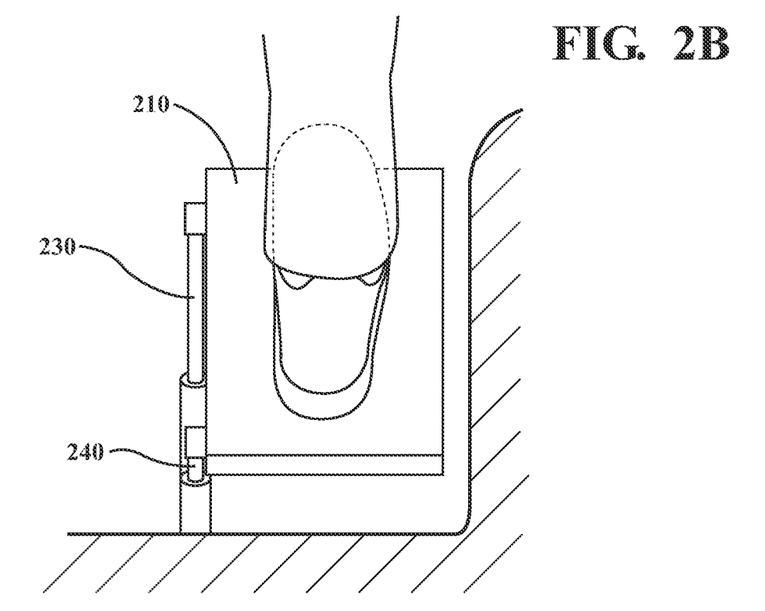
FIG. 2B illustrates a back-view of a control system including a combined pedal having sensors that receive operator commands and actuators that communicate recommended speeds.

Moreover, the pedal 210 may couple to a footwell of the vehicle 100 through the pivot device 220. The pivot device 220 may be mounted on a sidewall, riser, floor, bottom, or a top of the footwell. The control system 200 and center or off-center pivoting by the pivot device 220 use the accelerator device 230 and the braking device 240 to allow the motion 250 (e.g., rocking, rotation, etc.). For another perspective, FIG. 2B illustrates the control system 200 from a back-view with the accelerator device 230 and the braking device 240. Here, the control system 200 through the motion 250 pushes or virtually pulls a foot through actuator feedback for recommending speed changes to an operator. In other words, the control system 200 may trigger a rotation of the pedal 210 that initiates throttle or braking commands through respective sensors according to recommended ADS speeds and the central pivot separates input channels, thereby avoiding simultaneous commands for safety. For example, the throttle sensor of the accelerator device 230 signals an accelerator input according to detected pressure that is translated to an accelerator command by the throttle system 144. Here, the actuator of the braking device 240 may apply pressure on the pedal 210 for communicating less braking according to the recommended speed, thereby initiating the accelerator input and indirectly the accelerator command.

Furthermore, the control system 200 may communicate braking on the pedal 210 as follows. The ADS generates a recommended speed decrease to the braking system 142 or the throttle system 144 to an operator. In response, the actuator of the accelerator device 230 applies pressure to the pedal 210. The pressure or force on the distal end (i.e., toes) of a foot may cause an operator reaction. For example, the operator may suspend accelerator inputs or apply braking inputs through the motion 250 along a pivot point to slow the vehicle 100. In addition, the pivot device 220 may include a rotational actuator for communicating the recommended speed. For example, the control system 200 utilizes the rotational actuator to apply force or pressure on the pedal 210 in the direction of the motion 250 (e.g., clockwise, counter-clockwise, forward, back, etc.) along with the other actuators. As such, the control system 200 can utilize the accelerator device 230, the braking device 240, and the pivot device 220 to modulate the recommended speed, thereby improving feedback of recommended speeds by the ADS.

As a further enhancement, the control system 200 may halt and reverse the motion 250 according to a recommended speed change. For example, a reverse (e.g., clockwise) motion braking the vehicle 100 is halted or reversed by the control system 200 through the actuator of the braking device 240 applying force to the pedal 210 by extending a member. This action may then initiate an acceleration command through the acceleration device 230 and a rotation (e.g., counter-clockwise motion) of the pedal accordingly.

Similarly, a forward (e.g., counter-clockwise) motion accelerating the vehicle 100 may be halted or reversed by the control system 200 through the actuator of the accelerator device 230 applying force to the pedal 210. This action may then initiate a braking command through the braking device 240 and reverse (e.g., clockwise) motion of the pedal accordingly. In this way, the control system 200 modulates recommended speeds by the ADS using actuators on a combined pedal that produce push and pull effects or sensations.

Regarding operator comfort and safety, the control system 200 may minimize reaction times by allowing inputs of longitudinal control and feedback of the vehicle 100 at the same actuation point through the pedal 210. For example, an operator can react slower if the recommended speed change is communicated by the vehicle 100 on a heads-up display (HUD) instead of the pedal 210. This configuration may also impact safety due to confusion from feedback overload. The pedal 210 acting as a combined pedal also ensures that the operator is in direct contact during speed control and avoids sensing of the pedal location by feet.

Figure 3:
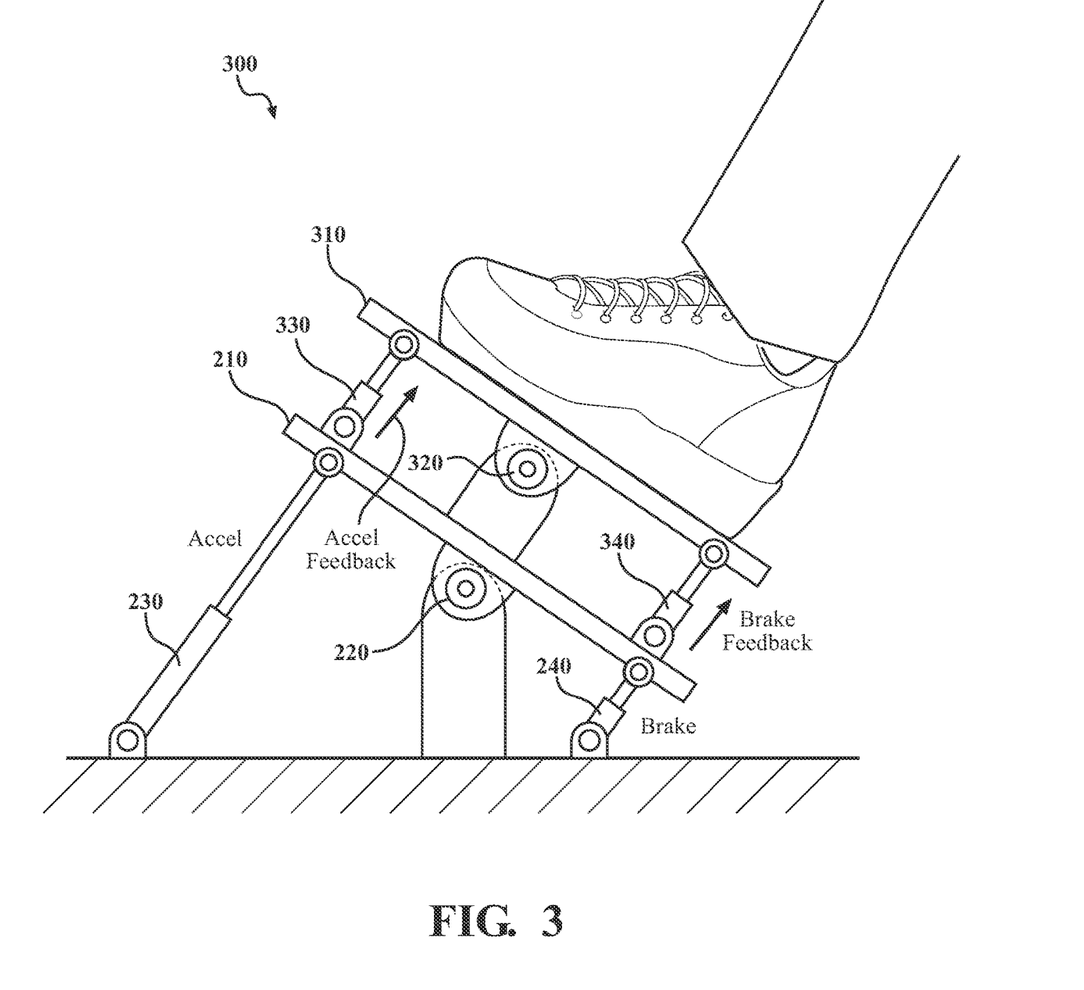
FIG. 3 illustrates one embodiment of the control system including a combined pedal that receives operator commands and a platform having actuators that independent of the pedal communicate recommended speeds.

Now turning to FIG. 3, one embodiment of a control system 300 including a combined pedal that receives operator commands and a platform 310 having actuators that independent of the pedal 210 communicate recommended speeds. Here, the control system 300 gives feedback through a combined pedal without directly altering operator commands using the pedal 210, the platform 310, and the platform pivot 320. In particular, the platform 310 may move about the platform pivot 320 on a center or off-center point for receiving feedback independent of the pedal 210. The control system 300 also separates throttle and brake control, thereby allowing the vehicle 100 to determine independent or blended commands and communicate feedback separately.

Regarding independent or decoupled feedback, the control system 300 may trigger the actuator 330 to push against the distal end (i.e., toes) of an operator foot as accelerator feedback (i.e., initiate braking or reduce acceleration). The actuator 330 may be pivoted to the platform 310 and/or the pedal 210 according to kinematic specifications for the pedals. Here, the control system 300 can continue receiving accelerator commands through the accelerator device 230 since feedback is decoupled or communicated separately. In other words, the accelerator feedback through the actuator 330 may cause motion to platform 310 about the platform pivot 320 with limited effects on acceleration commands. In addition, the actuator of the braking device 240 may regulate motion caused by force from the accelerator feedback through resistance or support to the pedal 210, thereby providing stability and added comfort.

Similarly, the control system 300 may trigger the actuator 340 to push against the heel of an operator foot as brake feedback (i.e., initiate acceleration or reduce braking). The actuator 340 may be pivoted to the platform 310 and/or the pedal 210 according to kinematic specifications for the pedals. Here, the control system 300 can continue receiving brake commands through the braking device 240 since feedback is communicated separately or decoupled. In other words, the brake feedback through the actuator 340 may cause motion to platform 310 about the platform pivot 320 with limited effects on brake commands. In addition, the actuator of the accelerator device 230 may regulate motion caused by force from the brake feedback through resistance or support to the pedal 210, thereby providing stability and added comfort.

In various implementations, the platform pivot 320 includes a rotational actuator for communicating the recommended speed. For example, the control system 300 utilizes the rotational actuator to apply force or pressure on the platform 310 in the direction of motion (e.g., clockwise, counter-clockwise) coordinated with other actuators. As such, the control system 300 can utilize the actuator 330, the actuator 340, and the platform pivot 320 to modulate the recommended speed, thereby improving feedback by the ADS.

Figure 4:
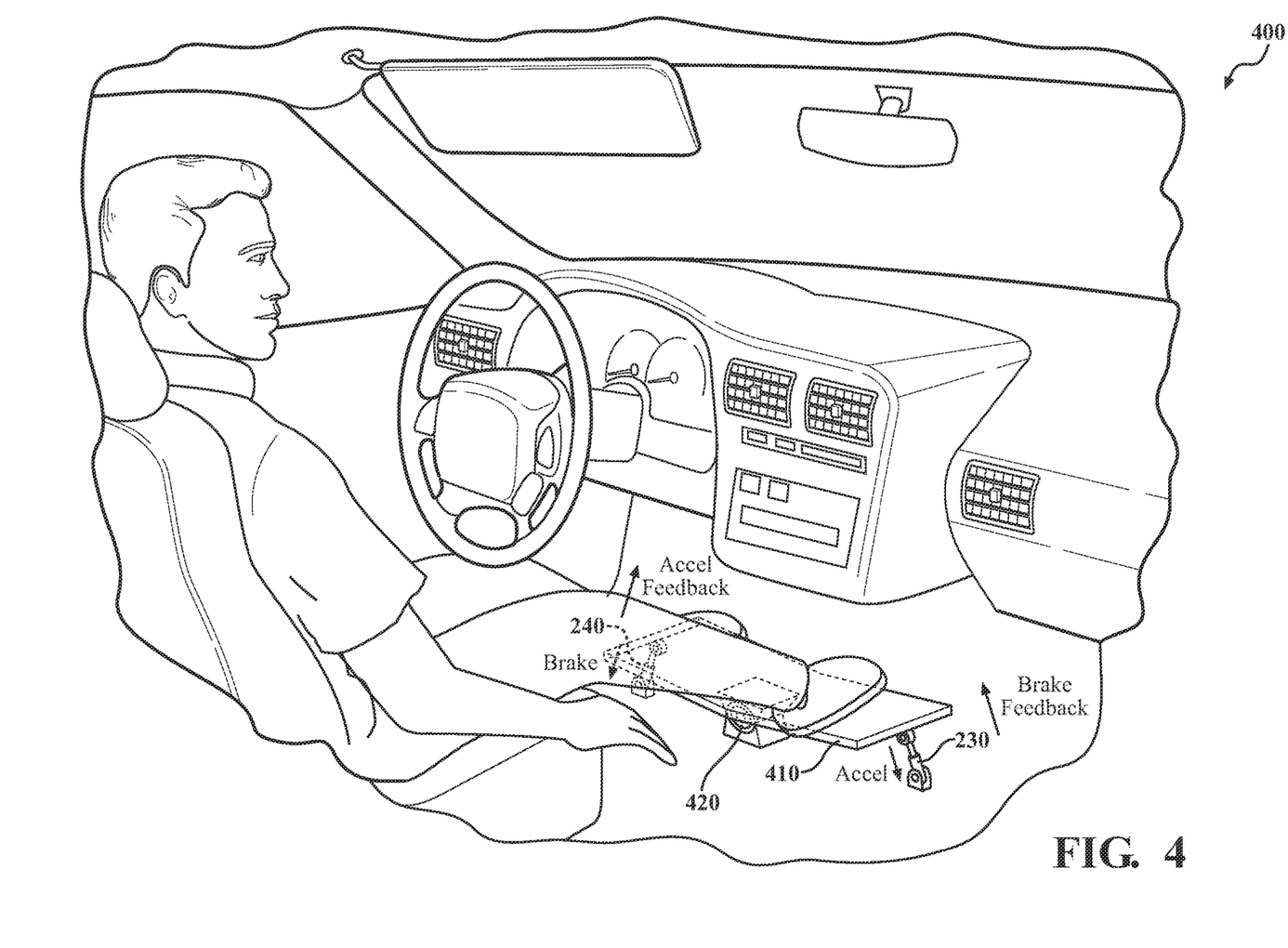
FIG. 4 illustrates one embodiment of the control system including a combined pedal mounted on a floor orthogonal to an operator having actuators that communicate recommended speeds.

FIG. 4 illustrates one embodiment of the control system 400 including a combined pedal positioned on a floor orthogonal to an operator having actuators that communicate recommended speeds to an operator, such as during manual driving. Here, the pedal 410 may be a curved or flat component positioned in a footwell of the vehicle 100 on a center or off-center pivot device 420. The position may be in a resting area for the operator to ensure that the control system 400 can communicate feedback regardless of feet location. In one approach, the operator is sitting orthogonally or in a resting position when controlling the pedal 410. The control system 400 can also receive inputs from multiple feet, thereby allowing variable control in response to recommended speed changes. In the control system 400, the operator may be resting while the vehicle 100 is partially automated and the pedal 410 communicates speed feedback for attracting attention or keeping the operator in-the-loop. Furthermore, the control system 400 can communicate upcoming speed changes using the pedal 410 for added comfort with the ADS. In various implementations, prior to recommending the speed change, a control system may determine that a safety margin or other metric satisfies a threshold and extends actuators accordingly. In one approach, the control system 400 is configured in an opposite manner where a left portion initiates acceleration commands and a right portion initiates braking commands as a different control paradigm.

Regarding inputs, the throttle sensor of the acceleration device 230 senses an acceleration command through pressure on the right of the pedal 410. In one approach, the throttle sensor senses an input that the vehicle 100 translates into an operator command, such as using a pedal mapping. The vehicle 100 may also apply the input directly as the operator command. Similarly, the control system 400 may detect a press to the left of the pedal 410 as a brake command. Regarding feedback, the control system 400 communicates a recommended speed by causing an actuator of the acceleration device 230 to push against a right portion of the pedal 410 (i.e., initiate deceleration or braking), such as by extending a member. On the contrary, an actuator of the braking device 240 pushes a left portion of the pedal 410 (i.e., initiate acceleration or reduce braking) according to the recommended speed by the ADS.

As a further enhancement, the control system 400 may halt and reverse an operator command according to a recommended speed change. For example, braking the vehicle 100 is halted or reversed by the control system 400 through the actuator of the braking device 240 applying force to the pedal 410. This action may then trigger the initiation of an acceleration command through the acceleration device 230. Similarly, accelerating the vehicle 100 is halted or reversed by the control system 400 through the actuator of the accelerator device 230 applying force to the pedal 410. This action may then trigger the initiation of a braking command through the braking device 240. In this way, the control system 400 modulates recommended speeds by the ADS using actuators on a combined pedal while an operator is seated and resting.

Regarding operator comfort and safety, the control system 400 allowing inputs of longitudinal control and feedback of the vehicle 100 at the same actuation point through the pedal 410 may minimize reaction times. For example, an operator can react slower if the recommended speed change is communicated by the vehicle 100 on a heads-up display (HUD) instead of the pedal 410. This configuration may also impact safety due to confusion from feedback overload. The pedal 410 acting as a combined pedal also ensures that the operator is in direct contact during speed control and avoids sensing of the pedal location by appendages.

Figure 5:
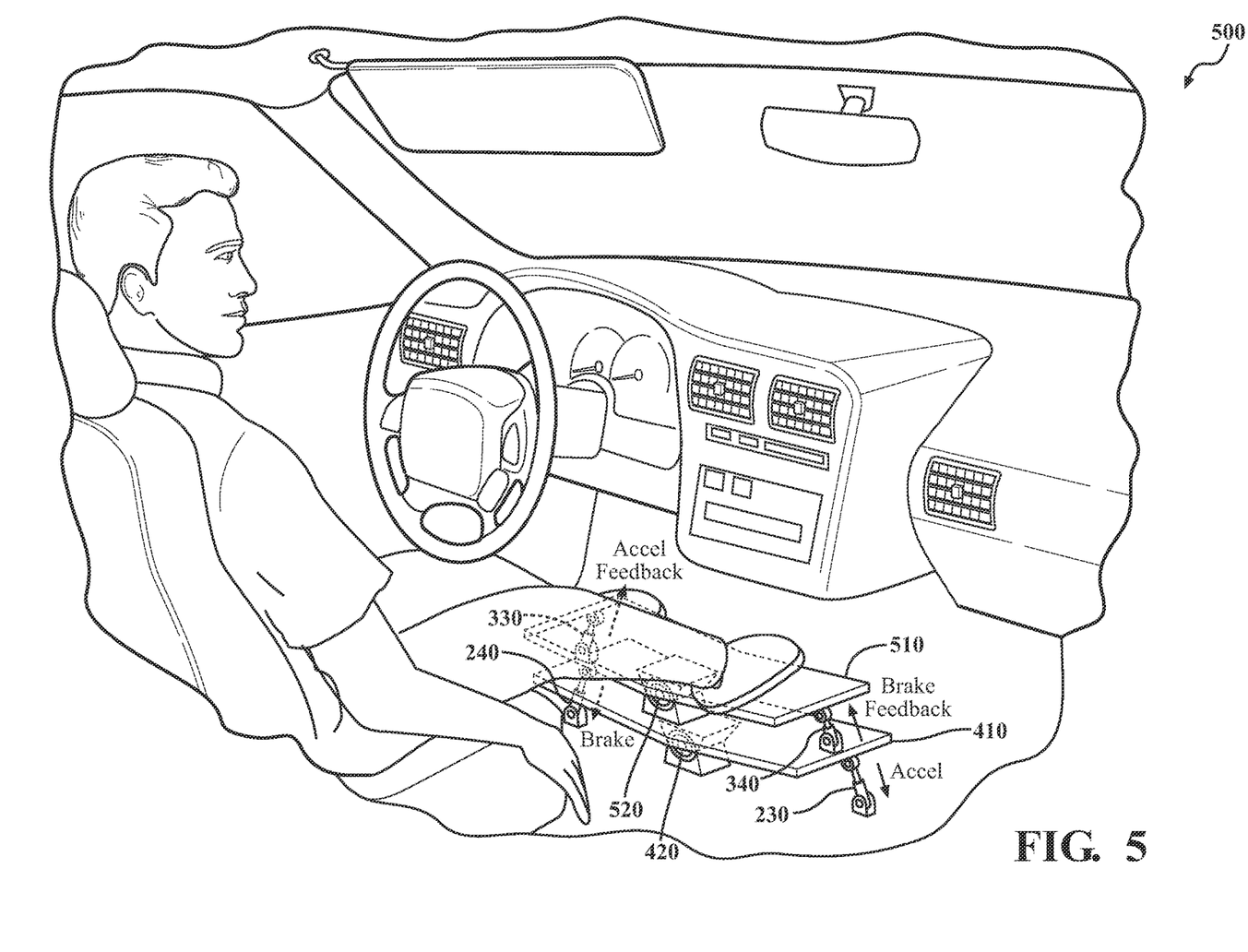
FIG. 5 illustrates one embodiment of the control system including a combined pedal positioned on a floor orthogonal to the operator including a platform having actuators that independent of the pedal communicate recommended speeds.

Now turning to FIG. 5, one embodiment of the control system 500 including a combined pedal positioned on a floor orthogonal to the operator including the platform 510 having actuators that independent of the pedal 410 communicate recommended speeds is illustrated. Similar to the control system 300, feedback is given through a combined pedal without changing operator commands using the pedal 410, the platform 510, and the platform pivot 520. In particular, the platform 510 may move about the platform pivot 520 on a center or off-center point from feedback independent of the pedal 410. Here, the control system 500 separates throttle and brake control, thereby allowing the vehicle 100 to determine independent or blended commands and also communicate feedback separately.

Regarding independent or decoupled feedback, the control system 500 may trigger the actuator 330 to push against the left foot of an operator as accelerator feedback (i.e., reduce braking or initiate acceleration). Here, the control system 500 can continue receiving accelerator commands through the accelerator device 230 since feedback is communicated separately to the left foot. In other words, the accelerator feedback through the actuator 330 may cause motion to platform 510 about the platform pivot 520 with limited effects on acceleration commands communicated through the right foot. In addition, the actuator of the acceleration device 230 may regulate motion caused by force from the accelerator feedback through resistance or support to the pedal 410, thereby providing stability and added comfort.

Similarly, the control system 500 may trigger the actuator 340 to push against the right foot as brake feedback (i.e., initiate braking or reduce acceleration). Here, the control system 500 can continue receiving brake commands through the braking device 240 since feedback is communicated separately. In other words, the brake feedback through the actuator 340 may cause motion to platform 510 about the platform pivot 520 with limited effects on brake commands communicated through the left foot. In addition, the actuator of the braking device 240 may regulate motion caused by force from the brake feedback through resistance or support to the pedal 410, thereby providing stability and comfort.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include the sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110 and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140 and, thus, may be partially or fully autonomous as defined by the society of automotive engineers (SAE) levels 0 to 5.

The processor(s) 110 and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140.

The processor(s) 110 and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110 and/or the automated driving module(s) 160 can control the direction and/or speed of the vehicle 100. The processor(s) 110 and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A control system comprising:
   a pedal coupled to a first device, the first device having a throttle sensor for a vehicle, and a first actuator that generates throttle feedback by applying a force push to the pedal outwards; and
   the pedal coupled to a second device having a brake activation sensor for the vehicle and a second actuator that generates braking feedback, the first actuator forces a clockwise rotation and a reverse motion of the pedal that initiates a braking command through the brake activation sensor according to a recommended speed computed using vehicle data, and the pedal is a single control point for the first device and the second device and includes a centralized pivot on the vehicle and a brake actuator forces a counter-clockwise rotation associated with reversing the recommended speed.

2. The control system of claim 1, further comprising the brake activation sensor having the brake actuator that selectively resists the pedal before receiving foot pressure for the clockwise rotation.

3. The control system of claim 1, further comprising a foot platform with an end movable by the first actuator before another rotation, wherein the throttle sensor is proximate to the end and the brake activation sensor is located at another end.

4. The control system of claim 3, further comprising the brake activation sensor having the brake actuator that selectively resists the pedal before receiving foot pressure.

5. The control system of claim 3, further comprising the second actuator that selectively halts the another rotation and initiates an acceleration command according to a change in the recommended speed from an automated driving system (ADS).

6. The control system of claim 1, wherein the vehicle data is any one of map data, sensor data, and automation data from an automated driving system (ADS) and the vehicle is under manual control when receiving the recommended speed.

7. The control system of claim 1, wherein the first actuator includes a solenoid that is electrically controllable to apply the force according to the recommended speed.

8. A control system comprising:
   a pedal coupled to a first device, the first device having a throttle sensor for a vehicle, and a first actuator that generates throttle feedback by applying an outward force, the pedal centrally pivoted on a floor for separate control through a first end and a second end and orthogonal to an operator; and
   the pedal coupled to a second device having a brake activation sensor for the vehicle and a second actuator that generates acceleration feedback, the first actuator forces a clockwise rotation and a reverse motion associated with a braking command through the brake activation sensor according to a recommended speed from an automated driving system (ADS), and the pedal is a single control point for the first device and the second device and a brake actuator forces a counter-clockwise rotation associated with reversing the recommended speed.

9. The control system of claim 8, further comprising a foot platform with an input end movable by the first actuator, wherein the throttle sensor is proximate to the input end and the brake activation sensor is located at another end.

10. The control system of claim 9, further comprising the brake activation sensor having the brake actuator that resists a position change of the pedal before receiving foot pressure for the braking command.

11. The control system of claim 9, further comprising the second actuator that selectively halts the braking command and initiates an acceleration command according to a change in the recommended speed from the ADS.

12. The control system of claim 9, wherein the throttle sensor and the brake activation sensor initiate commands from different feet of the operator.

13. The control system of claim 8, wherein the ADS determines the recommended speed while disengaged and the vehicle being under manual control.

14. The control system of claim 8, wherein the first actuator includes a solenoid that is electrically controllable to apply the outward force according to the recommended speed.

15. A control system comprising:
   a pedal coupled to a throttle sensor for a vehicle and a first actuator that generates throttle feedback by applying outward force to a platform; and
   the pedal coupled to a brake activation sensor for the vehicle and the pedal coupled with a second actuator that generates braking feedback to the platform, the first actuator forces a clockwise rotation and a reverse motion that initiates a braking command through the brake activation sensor according to a recommended speed from an automated driving system (ADS), and the pedal is a single control point for the throttle sensor and the brake activation sensor and includes a centralized pivot on the vehicle and a brake actuator forces a counter-clockwise rotation associated with reversing the recommended speed.

16. The control system of claim 15, wherein the platform has another central pivot point to the pedal.

17. The control system of claim 15, wherein the platform moves independent of the pedal during the throttle feedback.

18. The control system of claim 15, further comprising the brake activation sensor having the brake actuator that selectively resists the pedal during the throttle feedback.

19. The control system of claim 15, further comprising the second actuator having a solenoid that selectively halts the braking command and initiates an acceleration command according to a change in the recommended speed from the ADS.

20. The control system of claim 15, wherein the first actuator includes a solenoid that is electrically controllable to apply the outward force according to the recommended speed.

* * * * *